United States Patent [19]
Breslau et al.

[11] Patent Number: 5,189,563
[45] Date of Patent: Feb. 23, 1993

[54] VIDEO TAPE EDITOR WITH FADE CONTROL FUNCTIONS

[75] Inventors: Steven M. Breslau, Chicago, Ill.; Han-Min Peng; Chieh-Chi Kang, both of Taipei, Taiwan

[73] Assignee: Sima Products Corporation, Skokie, Ill.

[21] Appl. No.: 627,746

[22] Filed: Dec. 14, 1990

[51] Int. Cl.⁵ .............................. G11B 27/02
[52] U.S. Cl. .................. 360/14.1; 360/19.1; 360/61; 358/182
[58] Field of Search .............. 360/13, 14.1, 19.1, 360/15, 61; 358/311, 182

[56] References Cited

U.S. PATENT DOCUMENTS

| | | | |
|---|---|---|---|
| 3,575,552 | 4/1971 | Grant et al. | 360/13 X |
| 3,748,381 | 7/1973 | Strabele et al. | 360/14.1 X |
| 4,261,012 | 4/1981 | Maloomian | 360/14.1 |
| 4,272,790 | 6/1981 | Bates | 360/14.1 |
| 4,283,735 | 8/1981 | Jagger | 358/4 |
| 4,319,286 | 3/1982 | Hanpachern | 360/33.1 |
| 4,618,895 | 10/1986 | Wright | 358/311 |
| 4,723,176 | 2/1988 | Ive | 360/13 X |
| 4,746,994 | 5/1988 | Ettlinge | 360/13 |
| 4,766,501 | 8/1988 | Hjelm et al. | 358/311 |
| 4,786,981 | 11/1988 | Sekimoto et al. | 360/10.3 |
| 4,858,027 | 8/1989 | Sashou et al. | 358/311 |
| 5,055,939 | 10/1991 | Karamon et al. | 358/341 |

*Primary Examiner*—Andrew L. Sniezer
*Attorney, Agent, or Firm*—Silverman, Cass & Singer, Ltd.

[57] ABSTRACT

A video tape editing apparatus for use with first and second video playback devices and a video recording device allows effective editing of homemade video tapes which produces clean, professional transitions of the edit-points. The editing apparatus includes a fade control circuit having a fade selector switch for generating a fade-out control signal to shunt the composite video signal components in a video amplifier when the fade switch is in a first position and for generating a fade-in control signal to remove the shunting of the composite video signal components in the video amplifier when the fade switch is in a second position.

20 Claims, 4 Drawing Sheets

5,189,563

VIDEO TAPE EDITOR WITH FADE CONTROL FUNCTIONS

BACKGROUND OF THE INVENTION

1. Field of the Invention

This invention relates generally to electronic editing apparatus and more particularly, it relates to an improved video tape editing apparatus which allows effective editing of homemade video tapes without the complication and expense of the usual professional editing equipment.

In recent years, there has been a great increase in the ownership of camcorders with a corresponding growth in the development of home video recording and editing. Frequently, the users of home video equipment will desire to edit their initial or so-called "master" home video tapes so as to eliminate, rearrange, or add scenes which will produce a more desirable video tape. For instance, many a home video recording enthusiast will generally want to, after having recorded the initial home video tape, edit out certain less important scenes or segments or other undesired portions such as commercial messages and the like. While professional editing equipment does exist for those in the television industry, such editing equipment has been traditionally unavailable to the home video recording enthusiast or has been relatively high in cost so as to be unaffordable.

2. Description of the Prior Art

A prior art search in the United States Patent and Trademark Office directed to the subject matter of this application disclosed the following U.S. Pat. Nos., 4,283,735; 4,319,286; 4,618,895; 4,766,501; 4,786,981; and 4,858,027.

However, none of the prior art patents uncovered from the search disclosed a video tape editing apparatus like that of the present invention which includes a fade control circuit for producing clean, professional transitions at the edit-points. This is accomplished by simply depressing an auto-fade button so as to cause automatically video and audio fade out and fade in edits.

SUMMARY OF THE INVENTION

Accordingly, it is a general object of the present invention to provide an improved video tape editing apparatus which is relatively simple and economical to manufacture and assemble, but has been traditionally unavailable.

It is an object of the present invention to provide an improved video tape editing apparatus which allows effective editing of homemade video tapes without the complication and expense of the usual professional editing equipment.

It is another object of the present invention to provide a video tape editing apparatus for use with first and second video playback devices and a video recording device to produce clean, professional transitions at edit-points.

It is still another object of the present invention to provide an improved video tape editing apparatus which includes a fade control circuit for causing automatically video and audio fade out and fade in edits upon depression of an auto-fade button.

It is yet still another object of the present invention to provide an improved video tape editing apparatus which includes a fade control circuit having a fade selector switch for generating a fade-out control signal when the fade switch is in a first position and for generating a fade-in control signal when the fade switch is in a second position.

In accordance with these aims and objectives, the present invention is concerned with the provision of a video tape editing apparatus for use with first and second video playback devices and a video recording device to produce clean, professional transitions at edit-points which includes a first input connectible to the first video playback device for receiving a first source of composite video signal components and audio signal components, a second input connectible to the second video playback device for receiving a second source of composite video signal components and audio signal components, and a selector switch for selectively switching between the first input and the second input. A first video amplifier is coupled to the selector switch and is responsive to the composite video signal components for generating a first amplified video signal. A sync separator circuit is also coupled to the selector switch and is responsive to the composite video signal components for generating a horizontal sync pulse. A second video amplifier is responsive to the first amplified video signal for generating a second amplified video signal at a video output. A trigger circuit is responsive to the horizontal sync pulse for generating a sync control signal having a predetermined duration.

A fade control circuit having a fade selector switch is provided for generating a fade-out control signal when the fade switch is in a first position so as to shunt the composite video signal components in the first video amplifier to ground. The fade control circuit further generates a fade-in control signal when the fade switch is in a second position so as to remove the shunting of the composite video signal components in the first video amplifier.

BRIEF DESCRIPTION OF THE DRAWINGS

These and other objects and advantages of the present invention will become more fully apparent from the following detailed description when read in conjunction with the accompanying drawings with like reference numerals indicating corresponding parts throughout, wherein.

DESCRIPTION OF THE PREFERRED EMBODIMENTS

Figure 1:
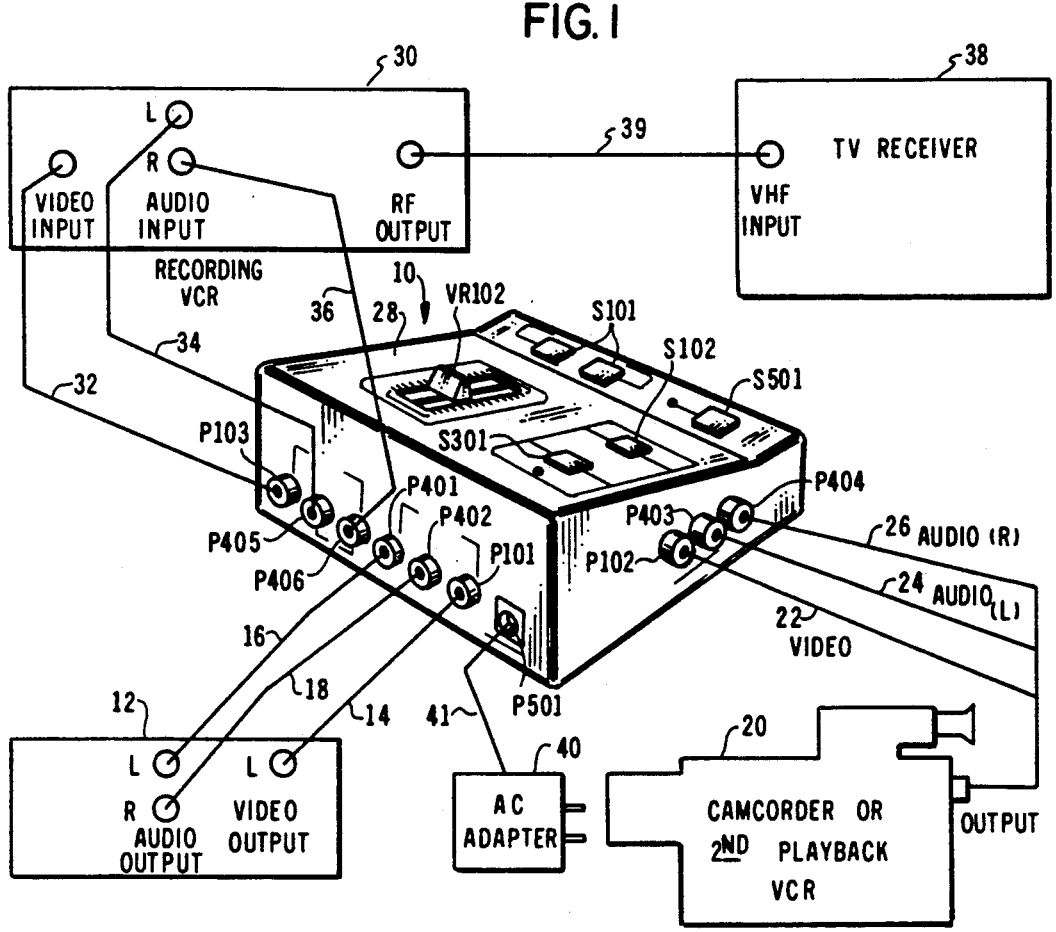
FIG. 1 is a pictorial representation of a video editing system utilizing a video editing apparatus of the present invention, illustrating the interconnection of the input and output plugs of the editing apparatus.
Figure 2:
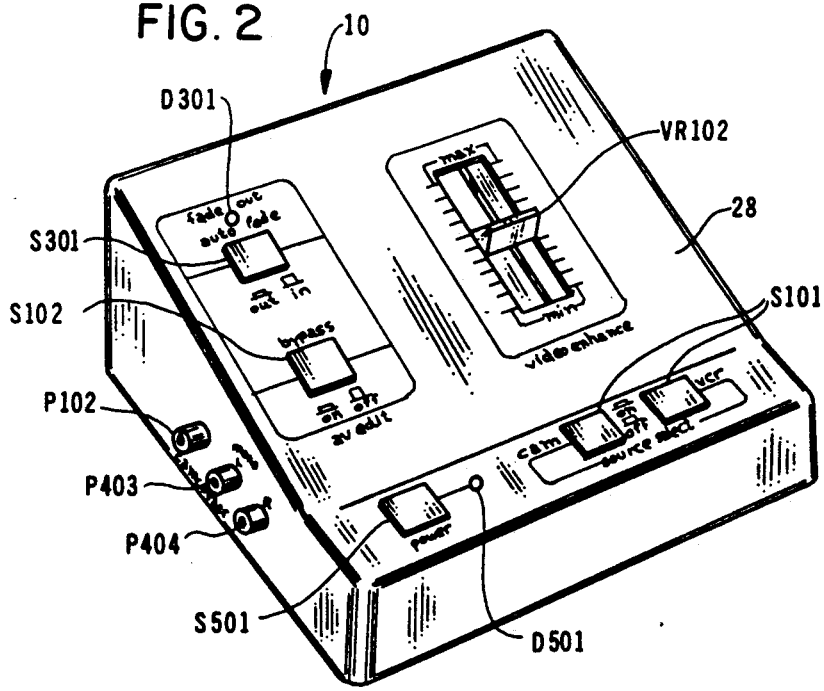
FIG. 2 is a perspective view of the video editing apparatus of FIG. 1, showing the switches and slide control.

Referring now in detail to the drawings, there is shown in FIGS. 1 and 2 a video editing system which utilizes a video editing apparatus 10 constructed in accordance with the principles of the present invention. The video editing apparatus 10 includes VCR input plugs P101, P401, and P402 for interconnection to a first source of an initial or "master" video tape which is referred to herein as a conventional type of playback video cassette recorder 12 (VCR) The video output of the playback VCR 12 is connected to the input plug P101 of the editing apparatus 10 via a cable 14, and the stereo audio outputs (left and right) of the VCR 12 are connected to the respective input plugs P401 and P402 of the editing apparatus via cables 16 and 18. If the VCR 12 provides only monaural sounds, then the plug P402 is not used.

The editing apparatus 10 further includes camcorder input plugs P102, P403, and P404 for interconnection to a second source of an initial or "master" video tape which is referred to herein as a conventional type of playback camcorder 20 (CAM). The video output of the playback CAM 20 is connected to the input plug P102 of the editing apparatus via a cable 22, and the stereo audio outputs (left and right) of the playback CAM 20 are connected to the respective input plugs P403 and P404 of the editing apparatus via cables 24 and 26.

It should be understood that the playback CAM 20 may be a second playback VCR or that the playback VCR 12 may be a second playback CAM. By the use of the playback VCR 12 and the playback CAM 20, the user of the editing apparatus 10 has two playing inputs as the sources of the original or master video tapes. A source selection switch S101 is provided on the top panel 28 of the editing apparatus which permits the user to easily switch back and forth between the two different playing inputs without disconnecting and reconnecting of the various input plugs.

The editing apparatus 10 further includes video and audio output plugs P103, P405, and P406 for interconnection to a conventional type of recording video cassette recorder (VCR) 30. The video output plug P103 is connected to the video input of the recording VCR 30 via cable 32, and the audio output plugs P405 and P406 are connected to the audio inputs of the recording VCR 30 via cables 34 and 36. The RF output of the recording VCR 30 is connected to the VHF input of a conventional television receiver or monitor 38 via cable 39 for viewing and listening while editing. An AC adapter 40 receives power from an AC outlet (not shown) and has its output connected to a dc input plug P501 of the editing apparatus via a lead wire 41.

By use of the playback VCR 12, playback CAM 20 and recording VCR 30, the editing apparatus 10 can provide edited first-copy tapes on the recording VCR 30 which contains only the selected portions of the master video tapes during playback from either the playback VCR or CAM and which have deleted the unselected portions of the master video tapes. Before editing can be started, the user must determine the selected portions or scenes of the master video tapes that are to be added or eliminated and their proper sequence. This is accomplished by playing the original or master video tape on the playing VCR or CAM which is used to do the editing and noting the appropriate counter readings for the beginnings and ends of the selected portions which are to be affected by such editing.

When the original video tapes have been so prepared, the original video tape or tapes are loaded into the respective playback VCR 12 and/or playback CAM 20 of the interconnected editing system of FIG. 1 and a blank video tape is loaded into the recording VCR 30. The power switch S501 is depressed so as to turn on the power to the editing apparatus 10, which will cause the light-emitting diode (LED) D501 on the top panel (FIG. 2) to light. Further, power should also be applied to all of the other remaining components of FIG. 1. The source selector switch S101 should be properly depressed into the correct position so as to receive either the video and audio input signals from the playback VCR 12 or the playback CAM 20. The picture quality can be checked by playing a portion of the original video tape and viewing the same on the television receiver 38. The video enhance slide control VR102 on the top panel can be adjusted so as to obtain an optimum picture which is bright and clear. The bypass switch S102 may be depressed so as to allow the user to compare the enhanced picture with the original picture.

Figure 3:
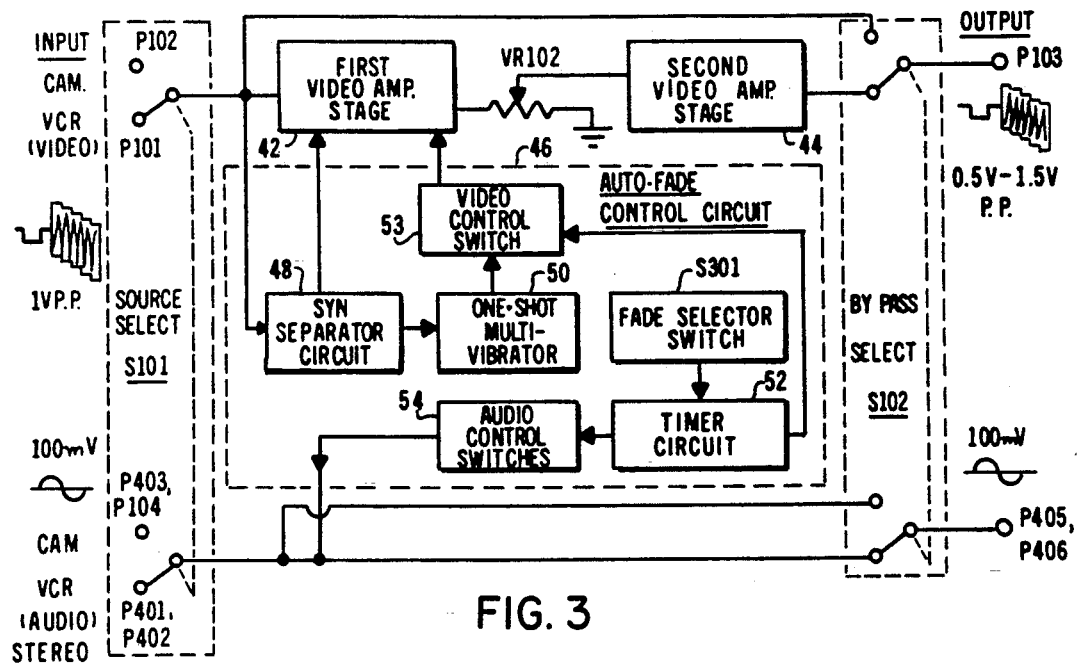
FIG. 3 is a block diagram of the video editing apparatus of FIG. 1.

In FIG. 3, there is shown a block diagram of the editing apparatus 10 of FIGS. 1 and 2. The editing apparatus 10 includes a first video amplifier stage 42, a second video amplifier stage 44, and an auto-fade control circuit 46. The auto-fade control circuit 46 is formed of a synchronizing separator circuit 48, a one-shot multivibrator 50, a timer circuit 52, video control switch 53, audio control switches 54, and a fade selector switch S301. The source selection switch S101 is a pushbutton-type switch which permits the user to easily select the composite video and audio signal components of the original video tapes from either the playback VCR 12 via the plugs P102, P401 and P402 or the playback CAM 20 via the plugs P102, P403 and P404. In the position shown, the selection switch S101 is set to allow the editing apparatus 10 to receive the composite video and audio signal components of the original tape from the playback VCR 12. The bypass switch S102 is also a pushbutton-type switch which enables the user to bypass the editing apparatus 10 whose video output is on the plug P103 and audio output is on the plugs P405 and P406. In the position shown in FIG. 3, the editing apparatus is not being bypassed.

In operation of the editing apparatus 10, when the user reaches an edit-point, the auto-fade selector switch S301 is depressed which causes the video or picture to fade automatically to a dark or black screen in approximately 3 seconds. The green LED D301 (FIG. 2) on the editing apparatus will be lit to indicate that a "fade out" has occurred. When the screen on the television receiver 38 reaches fully black, the "pause" button on the recording VCR 30 is depressed. This serves to hold the edited video tape in position for the next scene to be inserted. By depressing the bypass switch S102 on the editing apparatus, the picture from the recording VCR will reappear on the television screen. Next, the original video tape in the playback VCR 12 is advanced to the counter reading corresponding to the beginning of the next scene which is desired to be inserted by the user. The location of the playing video tape should be adjusted so as to allow approximately 3 seconds for fading back in. Now, the "pause" button on the playback VCR 12 is also depressed.

In order to fade back in, the bypass switch S102 is depressed once again so as to return the television screen to black. Then, the "pause" on the playback VCR 12 is released. The "pause" on the recording VCR 30 is also immediately released and the auto-fade selector switch S301 is depressed. As a result, the green LED D301 will be extinguished and the picture will automatically fade-in in approximately 3 seconds onto the television screen as recording on the recording VCR 30 begins again. This provides a clean, professional transition at the edit-point when going from one scene to another or to indicate a passage of time. This procedure is repeated at the next edit-point and at each subsequent edit-point thereafter.

Figure 4:
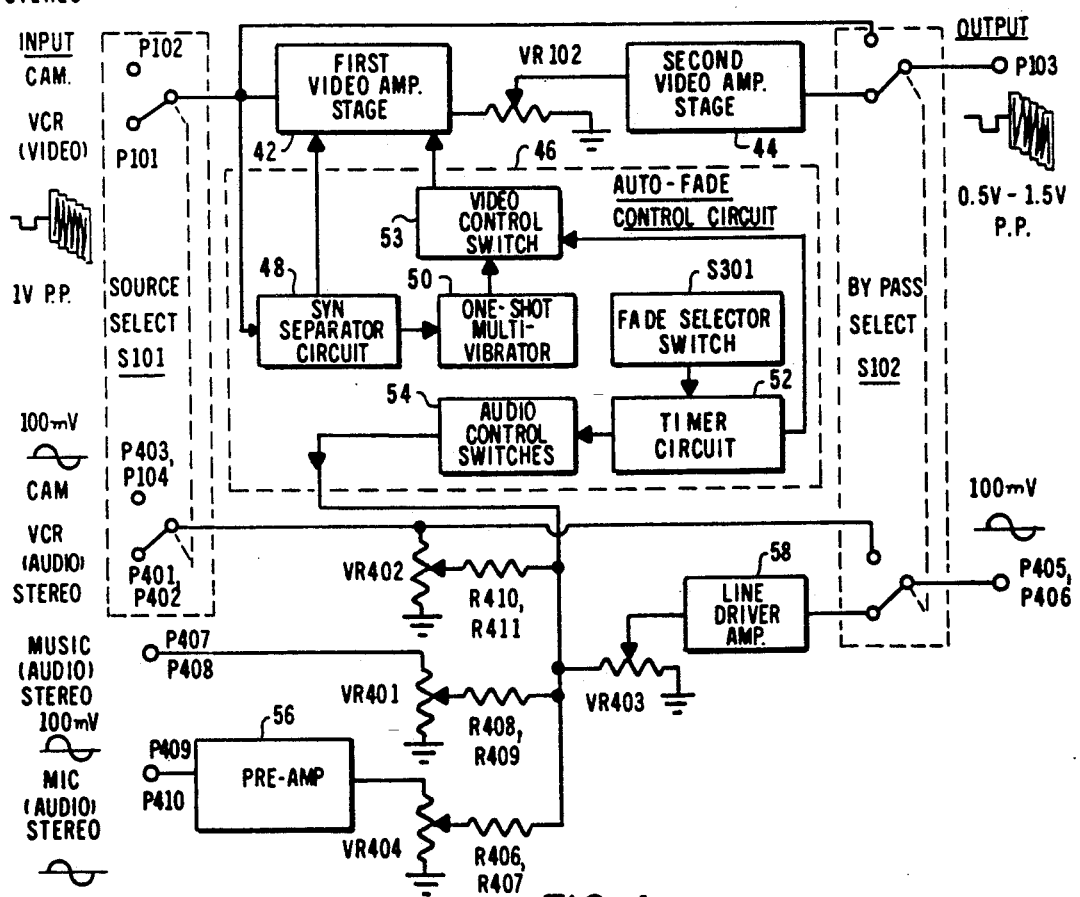
FIG. 4 is a block diagram of a second embodiment of a video editing apparatus.

In FIG. 4, there is shown in block diagram a second embodiment of an editing apparatus which is generally similar to that of FIG. 1. However, the editing apparatus 10a of FIG. 4 further includes two additional sets of audio input plugs P407, P408 and P409, P410 for allowing the capability of supplying background music and narration. The music input plugs P407 and P408 are used to receive stereo music, and the microphone input plugs P409 and P410 are used to receive stereo audio voice signals from a microphone (not shown). The editing apparatus 10a also includes a microphone amplifier or pre-amplifier 56 for amplifying the voice signals and a line driver amplifier stage 58 for amplifying the audio signals from the various audio input sources. There are provided volume slide controls VR401-VR404 for adjusting the volume levels from the different audio input sources.

Figure 5A:
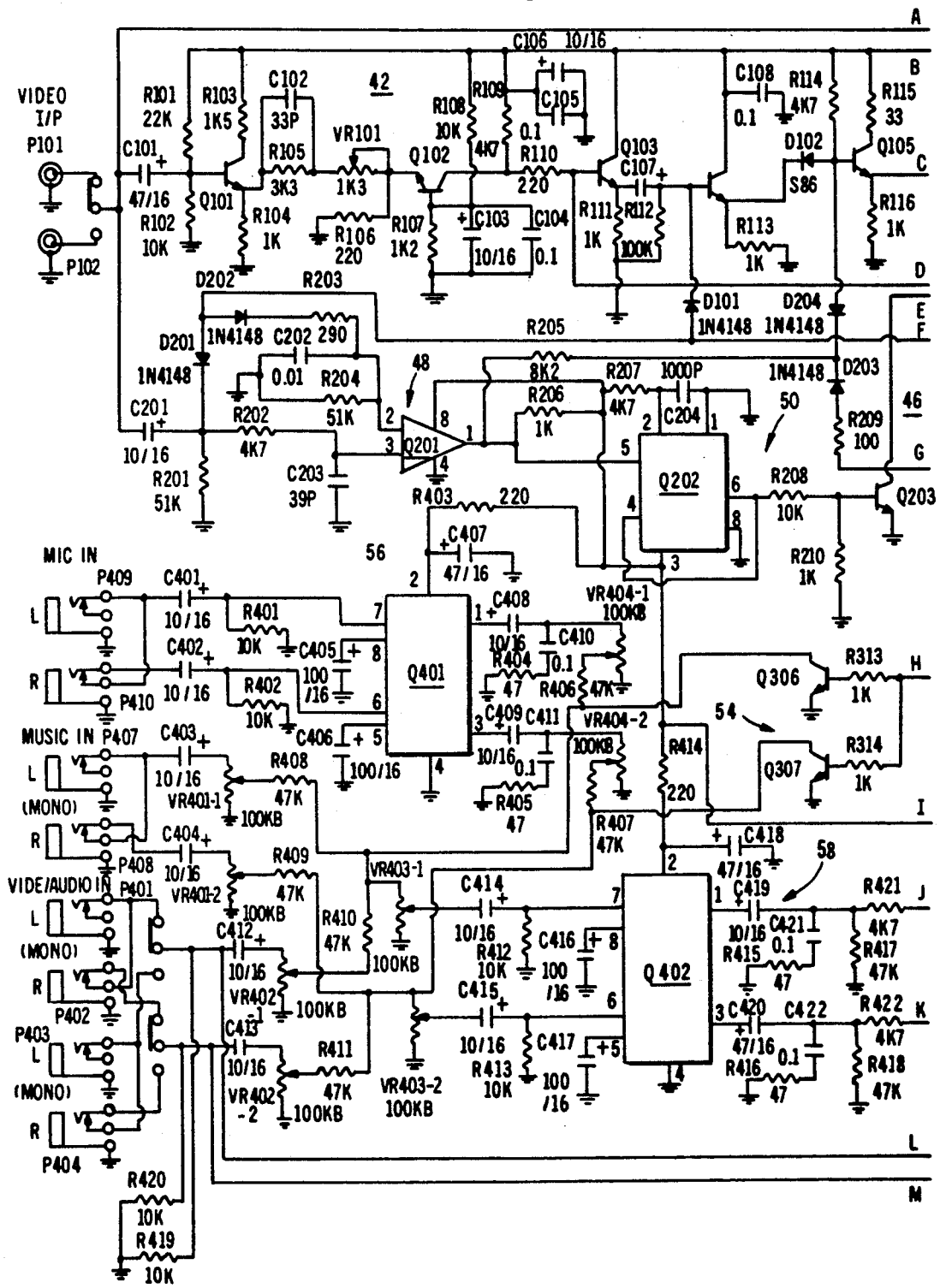
FIGS. 5a–5b are a detailed schematic circuit diagram of the video editing apparatus of FIG. 4.
Figure 5B:
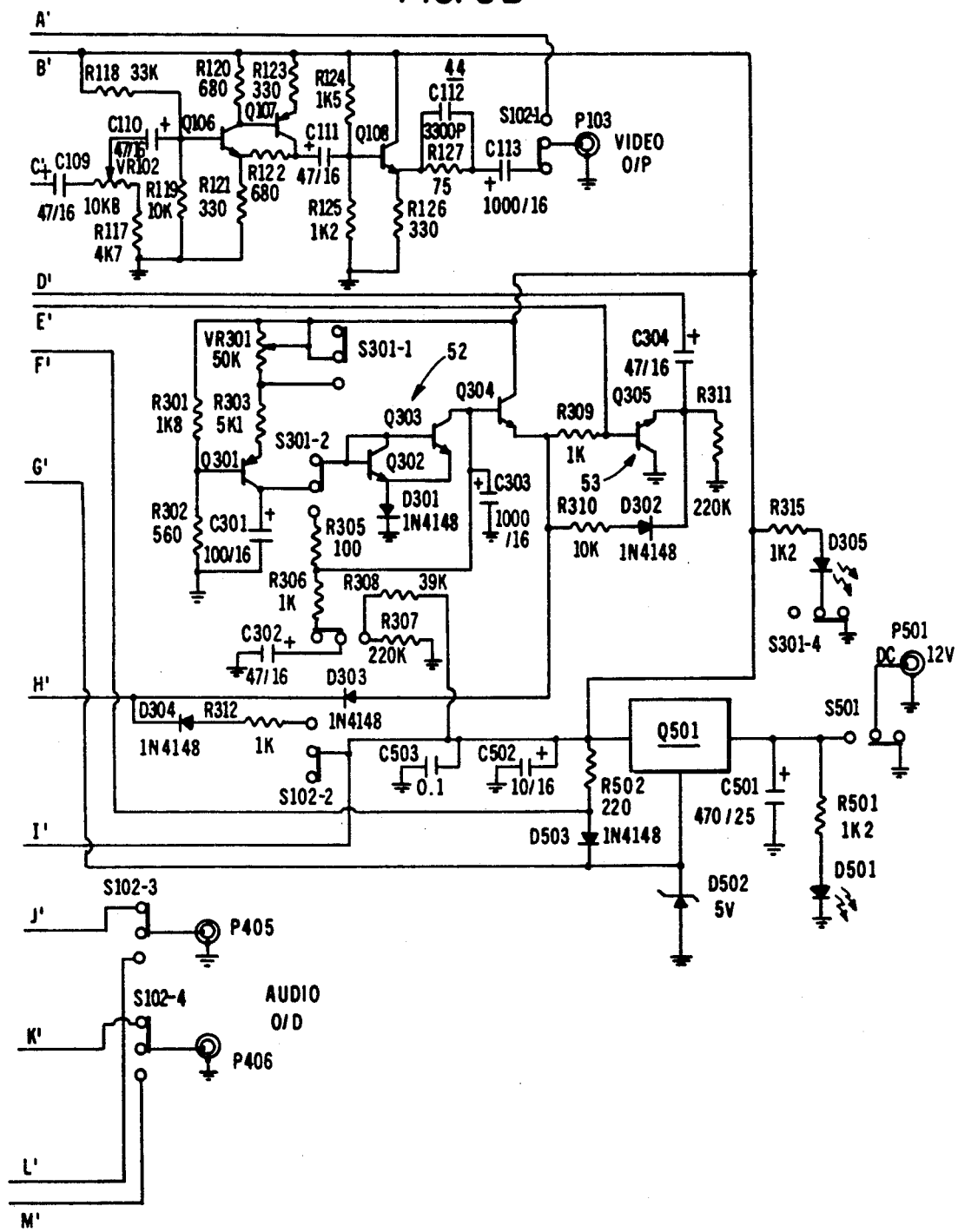

A detailed schematic circuit diagram of the editing apparatus 10a of FIG. 4 is illustrated in FIGS. 5A and 5B, with like reference numerals designating like parts. The standard one volt peak-to-peak video input signal from the playback VCR 12 is fed into the input plug P101 and to the first video amplifier stage 42. The video amplifier stage 42 is comprised of transistors Q101, Q102, Q103, Q104 and Q105 and their associated components. The video input signal is coupled via the capacitor C101 to the base of the transistor amplifier Q101. The transistor Q102 is for impedance matching and is interconnected between the output of the transistor amplifier Q101 and the emitter follower transistor Q103. The video signal at the emitter of the transistor Q103 is further amplified by the transistor amplifiers Q104 and Q105 of the video amplifier stage 42. The output of the amplifier stage 42 is defined by the emitter of the transistor amplifier Q105.

The output of the first amplifier stage 42 is coupled to the input of the second video amplifier stage 44 via a capacitor C109 and the "video enhance" slide control potentiometer VR102. The wiper arm of the potentiometer VR102 is coupled via a capacitor C110 to the input of the second video amplifier stage 44. The second video amplifier stage 44 is formed of transistors Q106, Q107, Q108 and their associated components. The output of the second amplifier stage 44 is defined by the emitter of the transistor amplifier Q109 which is coupled to the video output plug P103. By adjusting the potentiometer VR102, the video signal at the output plug P103 can be boosted up or enhanced up to 6 decibels so as to restore the color and brightness of the picture which is generally lost during the dubbing or copying process.

The synchronizing separator circuit 48 of the faded control circuit 46 consists of an input coupling capacitor C201, a low-pass filter formed of resistor R202 and capacitor C203, and an I.C. comparator C201. The video input signal from the input plug P101 is also coupled via the capacitor C201 to the low-pass filter, which removes much of the picture content, and is then fed to one input of the comparator Q201. The other input of the comparator Q201 is a reference voltage obtained from the voltage divider formed by resistors R203 and R204. This reference voltage is just slightly less than 5.0 volts. The output of the comparator Q101 on output pin 1 provides a negative-going representation of the television horizontal synchronizing pulse having an amplitude of 0-10 volts. The comparator Q201 is preferably similar to one commercially available from National Semiconductor under their part No. LM393. The output of the comparator Q201 is fed via a resistor R205 and a diode D204 to the base of the transistor amplifier Q105 of the first video amplifier stage 42 so as to insure that a proper sync pulse exists at the emitter of the transistor Q105. It should be noted that the "natural" sync pulse from the transistor amplifier Q103 may have been degraded by the circuits of transistors Q101 and Q102.

The one-short multivibrator 50 (Q202) of the auto-fade control circuit 46 is an integrated circuit which is preferably similar to one commercially available from Rohm Semiconductor under their part No. BU4538B. The output of the comparator Q201 is also fed to the input pin 5 of the one-shot multivibrator Q202 which is triggered by the trailing edge of the horizontal sync pulse. The output pin 6 of the multivibrator Q202 provides a sync control pulse having a predetermined duration, which is approximately 5 microseconds, long and is fed to the base of a transistor Q203. The transistor Q203 is turned on during each sync control pulse from the multivibrator Q202.

The timer circuit 52 of the fade control circuit 46 is comprised of transistors Q301-Q304; resistors R301-R303, R305-R307; potentiometer VR301; capacitors C301-C303; and diode D301. The fade selector switch S102 is used to control the timer circuit 42. When the fade selector switch S103 is depressed to the position shown, the green LED D301 will be lit indicating a "fade out." Initially, the output of the timer circuit 52 at the emitter of the transistor Q304 will be at zero volts. Therefore, the transistor Q305 of the video control switch 53 will be turned off. As a result, the transistor amplifier Q103 in the first video amplifier stage 42 will not be shunted to ground which allows the video signal to pass through to the output transistor amplifier Q105 of the first video amplifier stage 42. The potentiometer VR301 is set so that the transistor Q304 will be turned on in approximately 3 seconds when the voltage on the capacitor C303 connected to its base slowly rises and reaches the threshold level. Then, the emitter of the transistor Q304 will be at approximately two volts which will cause the transistor Q305 to turn on and shunt to ground the video signal as well as the "natural" sync pulse at the base of the transistor amplifier Q103. Accordingly, the picture fades out to a black screen. Further, with the transistor Q304 being turned on this will also cause the pair of transistors Q306 and Q307 in the audio control switches 54 to turn on, thereby shunting both the channels of the audio signals to ground.

However, it will be noted that during each sync control pulse from the one-shot multivibrator Q202 the transistor Q203 will turn on, which in turn causes the transistor Q305 to be turned off. Consequently, the transistor amplifier Q103 will not be shunted to ground and thus passes the "natural" sync pulse therethrough. This is required for proper operation of the recording VCR 30. After the occurrence of the sync control pulse from the one-shot multivibrator, the transistor Q305 of the video control switch 53 will be turned on again which will shunt the base of the transistor amplifier Q103 to ground. Since the sync control pulse is isolated from the emitter of the transistor Q304 by the resistor R309, the audio signal will not be affected during each sync control pulse.

When it is desired to "fade in," the fade selector switch S301 is depressed again so as to move the contacts to the other position. This will cause the green LED D301 to become extinguished and the capacitors C301-C303 to quickly discharge. As a result, the transistor Q304 will be turned off and its emitter voltage will drop to zero volts. Thus, the transistor Q305 in the video control switch 53 and the transistors Q306 and Q307 in the audio control switches 54 will all be turned off. Consequently, the picture will fade in onto the television screen in approximately 3 seconds and the audio signals will also again appear.

In the audio circuitry, the pre-amplifier 56 (Q401) is an integrated circuit which is similar to the one commercially available from Samsung Semiconductor under their part No. 2209. The amplifier Q401 amplifies the audio signals derived from the microphone (not shown). The line driver amplifier 58 is used to amplify the audio signals from the various audio input sources. Preferably, the line driver 58 is an integrated circuit which is similar to one commercially available from Samsung Semiconductor under their part No. 2209. The potentiometers VR401-VR404 may be adjusted so as to control the level of the audio signal to the line amplifier 58. The editing apparatus 10a receives a suitable low voltage such as 12 VDC supplied by the power plug P505 and the power switch S501. This low voltage is fed to the input pin of a 3-terminal I.C. voltage regulator Q501, which is similar to one commercially available from National Semiconductor under their part No. BA7805. The regulator Q501 establishes a proper voltage level on its output pin. The editing apparatus 10a is preferably housed within a relatively compact enclosure which has the top panel 28 for mounting of the various switches S101, S102, S301, and S501; LEDs D305 and D501; and slide level controls VR401-VR404. The various plugs P101-P103 and P401-P410 of the editing apparatus are preferably located on the rear and side panels of the enclosure.

From the foregoing detailed description, it can thus be seen that the present invention provides an improved video tape editing apparatus which allows effective editing of home video tapes without the complications and expense of the usual professional editing equipment. The editing apparatus of the present invention includes a fade control circuit for producing clean, professional transitions at the edit-points.

While there has been illustrated and described what is at present considered to be preferred embodiments of the present invention, it will be understood by those skilled in the art that various changes and modifications may be made, and equivalents may be substituted for elements thereof without departing from the true scope of the invention. In addition, many modifications may be made to adapt a particular situation or material to the teachings of the invention without departing from the central scope thereof. Therefore, it is intended that this invention not be limited to the particular embodiments disclosed as the best mode contemplated for carrying out the invention, but that the invention will include all embodiments falling within the scope of the appended claims.

What is claimed is:

1. A video tape editing apparatus for use with first and second video playback devices and a video recording device to produce clean transitions at edit-points, said apparatus comprising:

first input means connectible to the first video playback device for receiving a first source of composite video signal components and audio signal components;

second input means connectible to the second video playback device for receiving a second source of composite video signal components and audio components;

output means including video and audio outputs, said output means connectible to the video recording device for sending said first source of composite video signal components and audio signal components, and for sending said second source of composite video signal components and audio signal components;

selection switch means for selectively switching between said first input means and said second input means;

first video amplifier means coupled to said selection switch means and being responsive to the selected composite video signal components for generating a first amplified video signal;

sync separator means coupled to said selection switch means and being responsive to the selected composite video signal components for generating a horizontal sync pulse;

second video amplifier means responsive to said first amplified video signal for generating a second amplified video signal at said video output of said output means;

trigger circuit means responsive to said horizontal sync pulse for generating a sync control signal having a predetermined duration;

fade control circuit means including a fade selector switch for generating a fade-out control signal when said fade switch is in a first position and for generating a fade-in control signal when said fade switch is in a second position;

video switch means responsive to said fade-out signal and coupled to said first video amplifier means for shunting of the selected composite video signal components therein to ground, said video switch means being further responsive to said sync control signal for preventing the shunting of the selected composite video signal components in said first video amplifier means for the duration of said sync control signal;

said video switch means being responsive to said fade-in signal for removing the shunting of the selected composite video signal components in said first video amplifier means; and audio switch means responsive to fade-out signal for shunting of the audio signal components to ground at said audio output of said output means, said audio switch means being responsive to said fade-in signal for removing the shunting of the audio signal components to ground.

2. A video tape editing apparatus as claimed in claim 1, wherein said first input means includes first video and audio plugs.

3. A video tape editing apparatus as claimed in claim 1, wherein said second input means includes second video and audio plugs.

4. A video tape editing apparatus as claimed in claim 1, wherein said selection switch means is comprised of a pushbutton-type switch.

5. A video tape editing apparatus as claimed in claim 1, wherein said first video amplifier means comprises a first video amplifier stage.

6. A video tape editing apparatus as claimed in claim 5, wherein said second video amplifier means comprises a second video amplifier stage.

7. A video tape editing apparatus as claimed in claim 1, wherein said trigger means comprises a one-shot multivibrator.

8. A video tape editing apparatus as claimed in claim 1, further comprising video enhance control means coupled between said first and second video amplifier means for adjusting the level of the video signal components.

9. A video tape editing apparatus as claimed in claim 8, wherein said video enhance control means comprises a potentiometer.

10. A video tape editing apparatus as claimed in claim 1, wherein said fade control means includes a timer circuit for generating the fade-out control signal having a positive voltage after a predetermined amount of time has lapsed.

11. A video tape editing apparatus as claimed in claim 10, wherein said timer circuit generates the fade-in control signal having no voltage after a second predetermined amount of time has lapsed.

12. A video tape editing apparatus as claimed in claim 1, wherein said video switch means comprises a video switch transistor.

13. A video tape editing apparatus as claimed in claim 1, wherein said audio switch means comprises a pair of audio switching transistors.

14. A video tape editing apparatus as claimed in claim 1, further comprising indicating means including a light-emitting diode being responsive to said fade selector switch and being lit when said fade selector switch is in the first position.

15. A video tape editing apparatus for use with first and second video playback devices and a video recording device to produce clean transitions at edit-points, said apparatus comprising:
  first input means connectible to the first video playback device for receiving a first source of composite video signal components and audio signal components;
  second input means connectible to the second video playback device for receiving a second source of composite video signal components and audio components;
  output means including video and audio outputs, said output means connectible to the video recording device for sending said first source of composite video signal components and audio signal components, and for sending said second source of composite video signal components and audio signal components;
  selection switch means for selectively switching between said first input means and said second input means;
  first video amplifier means coupled to said selection switch means and being responsive to the selected composite video signal components for generating a first amplified video signal;
  sync separator means coupled to said selection switch means and being responsive to the selected composite video signal components for generating a horizontal sync pulse;
  second video amplifier means responsive to said first amplified video signal for generating a second amplified video signal at said video output of said output means;
  trigger circuit means responsive to said horizontal sync pulse for generating a sync control signal having a predetermined duration;
  fade control circuit means including a fade selector switch for generating a fade-out control signal to shunt the selected composite video signal components in said first video amplifier means when said fade switch is in a first position and for generating a fade-in control signal to remove the shunting of the selected composite video signal components in the first video amplifier means when said fade switch is in a second position said fade control means further responsive to said sync control signal for preventing the shunting of the selected composite video signal components in said first video amplifier means for the duration of said sync control signal.

16. A video tape editing apparatus as claimed in claim 15, wherein said trigger means comprises a one-shot multivibrator.

17. A video tape editing apparatus as claimed in claim 15, further comprising video enhance control means coupled between said first and second video amplifier means for adjusting the level of the video signal components.

18. A video tape editing apparatus as claimed in claim 17, wherein said video enhance control means comprises a potentiometer.

19. A video tape editing apparatus as claimed in claim 15, wherein said fade control means includes a timer circuit for generating the fade-out control signal having a positive voltage after a predetermined amount of time has lapsed.

20. A video tape editing apparatus as claimed in claim 19, wherein said timer circuit generates the fade-in control signal having no voltage after a second predetermined amount of time has lapsed.

* * * * *

UNITED STATES PATENT AND TRADEMARK OFFICE
CERTIFICATE OF CORRECTION

PATENT NO. : 5,189,563
DATED : February 23, 1993
INVENTOR(S) : Steven M. Breslau, Kris Peng and Chich-Chi, Kang It is certified that error appears in the above-identified patent and that said Letters Patent is hereby corrected as shown below:

On the Title page, item [57]
Abstract, line 4, change "of" to --at--;

Column 3, line 1, after "(VCR)" insert a period (.);

Column 5, line 54, change "faded" to --fade--;

Column 7, line 23, change this line to read:

--58.

The editing apparatus 10a receives a suitable low--.

Signed and Sealed this

Ninth Day of November, 1993

Attest:

BRUCE LEHMAN

Attesting Officer     Commissioner of Patents and Trademarks